(12) United States Patent
Day

(10) Patent No.: US 6,513,079 B1
(45) Date of Patent: Jan. 28, 2003

(54) AUTOMATIC NEXUS RESTORE

(75) Inventor: Brian A. Day, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/991,063

(22) Filed: Nov. 21, 2001

(51) Int. Cl.[7] .......................... G06F 13/00; G06F 13/38
(52) U.S. Cl. .......................... 710/104; 710/313; 711/4
(58) Field of Search .................. 710/1, 22, 33, 710/104, 305, 313; 711/4, 112; 365/50, 230.01; 369/176; 714/16

(56) References Cited

U.S. PATENT DOCUMENTS 5,276,662 A * 1/1994 Shaver, Jr. et al.
5,835,742 A * 11/1998 James et al.
6,223,235 B1 * 4/2001 Cheng

* cited by examiner

*Primary Examiner*—Gopal C. Ray
(74) *Attorney, Agent, or Firm*—Carstens, Yee & Cahoon LLP

(57) ABSTRACT

When a specific pair of devices are selected or reselected for communications across a SCSI bus, a hardware state machine in each device restores the communication parameters that have been previously negotiated for this pair of devices. This prevents the devices from wasting bus time for the restoration.

15 Claims, 3 Drawing Sheets

AUTOMATIC NEXUS RESTORE

BACKGROUND OF THE INVENTION

1. Technical Field

The present invention is directed generally toward a method and apparatus for restoring nexus configuration values in a Small Computer Systems Interface (SCSI) device, and more specifically, to performing this restoration by hardware means rather than by firmware.

2. Description of the Related Art

A typical computer system includes a central processing unit (CPU) for performing computations, memory, and peripheral devices such as display monitors, printers, and disk drives for offline storage and communication with the outside world. Without something to interconnect these components, however, they cannot function as a system.

The primary apparatus for the interconnection of components in a computer system is known as a bus. A bus is a group of conductors that allows for communication between devices. A bus is like a data expressway, where the computer system components are positioned at the entrance and exit ramps. For instance, the central processing unit, memory, and peripheral devices may all be connected in parallel to a single bus.

Several different levels of buses may exist in a computer system. At the lowest level is the component-oriented (local) bus, which connects directly to the CPU. Component-oriented buses are generally specific to the particular type of CPU being used. For instance, the component-oriented bus in a computer system built around a Pentium microprocessor (CPU) is incompatible with a PowerPC microprocessor (CPU).

In many computers, however, there are two or more levels of buses (particularly in more modern computer systems). The component-oriented bus is often supplemented with a backplane or system bus. A backplane bus does not interface directly with the CPU, but is connected to the component-oriented bus by means of a backplane-to-host bridge.

Using a backplane bridge has a number of advantages, but two of them are of particular importance. First, because backplane buses are not connected to the component-oriented bus and CPU directly, when a component on the backplane bus fails, there is less likelihood of complete system failure, because the failure is isolated. Second, because backplane buses need not be specific to a particular model of processor, it is possible to have backplane bus standards that are independent of the choice of processor. This allows peripheral devices such as input/output (I/O) adapters to be interchangeable among disparate computing platforms.

One level further out from backplane buses are peripheral bus systems. Peripheral bus systems are true buses, but they are generally accessed through an input/output adapter situation on a backplane bus. Peripheral buses are commonly used to control storage devices, such as floppy disk drives and hard drives. Popular peripheral bus standards include the Small Computer System Interface (SCSI) standard and the Universal Serial Bus (USB) standard.

A SCSI bus can be connected to a number of peripheral devices, with current standards allowing for 16 devices. A host adapter is necessary for connection to the main processor, with the host adapter taking one of the sixteen device locations. Control of activity across the bus is not handled from a central location, but is distributed across all the devices using the bus, and happens independently of the central processing unit (CPU). Each SCSI device contains an integral controller, which can assert a need for access to the bus, recognize whether it has gained the desired access, and communicate with the other controllers regarding specific parameters for the transfer of information. Since each device can communicate with each other device on the bus, each controller must negotiate the protocols of data exchange with each of the other controllers and this negotiated information must be stored for future use. Additionally, negotiated parameters can vary depending on whether the instant device is the initiator of the interchange or the target of it, so values must be stored for either possibility. Thus, for a SCSI bus that can handle 16 devices, each controller must store information for the 15 other devices on the bus, with values for being either the initiator or the target, for a total of 30 different sets of information saved.

Whenever a device is selected for access to the bus, the correct information for the exchange must be moved to the registers used in the information exchange. There is a need to assure that these values are restored as quickly as possible, or the timely operation of the bus can be affected. Prior art has used software or firmware to restore these values quickly.

SUMMARY OF THE INVENTION

The present invention provides a hardware state machine, that is, a hard-wired circuit, to automatically restore SCSI configuration values within the controller. These values include parameters such as transfer speed, transfer bus width, synchronous offset, information unit transfers, etc. Parameters are stored in a memory array, indexed by the device identification numbers, and are automatically restored during the selection/reselection process.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
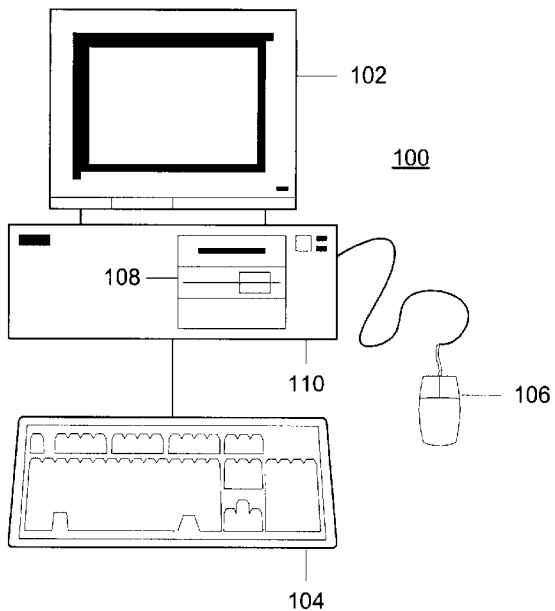
FIG. 1 is a diagram of a computer system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 also preferably includes a graphical user interface that may be implemented by means of systems software residing in computer readable media in operation within computer 100.

Figure 2:
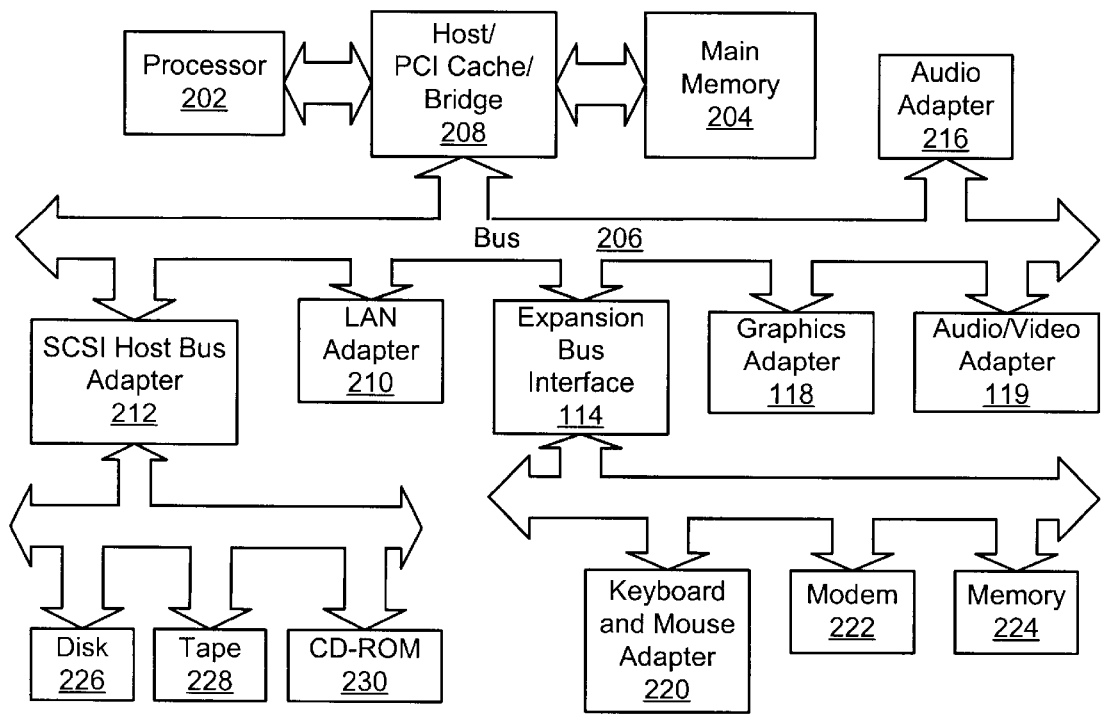
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots. or add-in connectors.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be-applied to a multiprocessor data processing system.

Data processing system 200 may also include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer. Data processing system 200 also may be a kiosk or a Web appliance.

Figure 3:
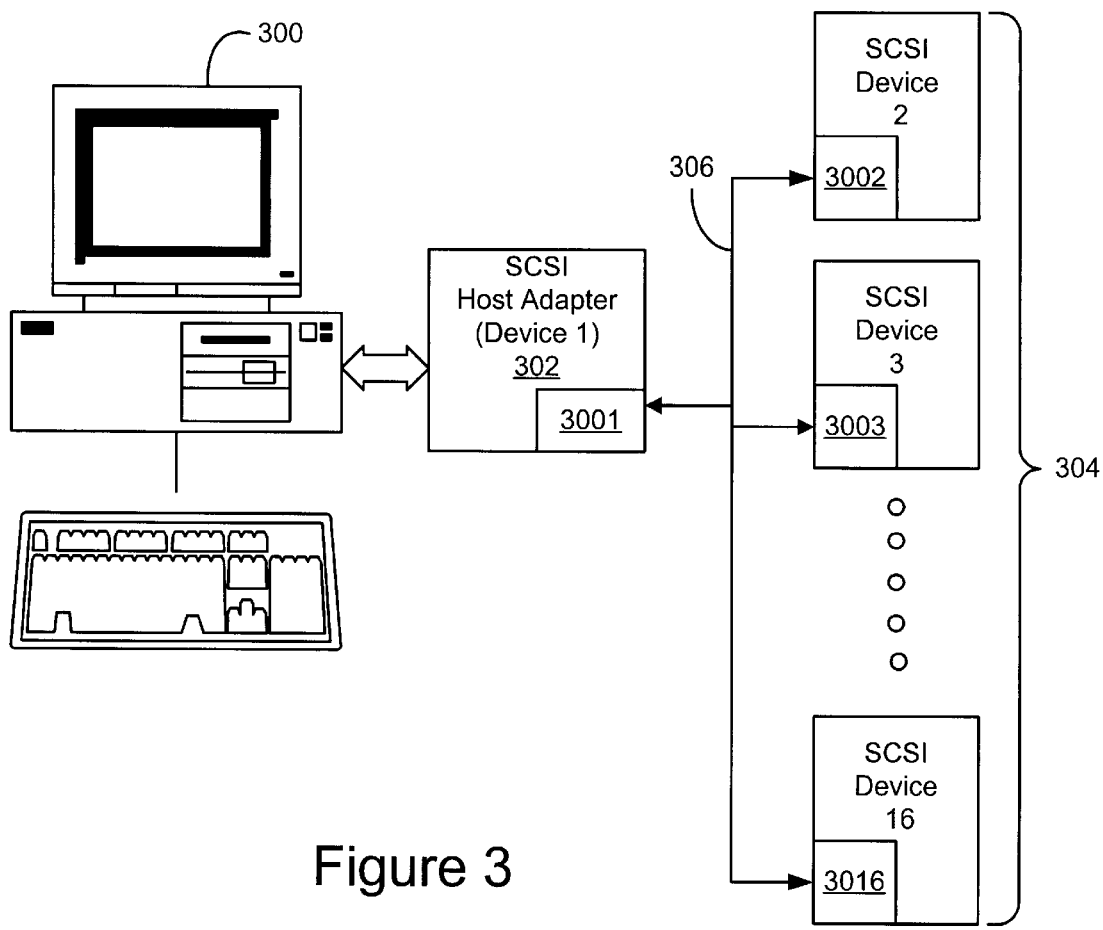
FIG. 3 is a block diagram of a SCSI bus system in accordance with a preferred embodiment of the present invention.

FIG. 3 is a diagram depicting the overall architecture of a Small Computer System Interface (SCSI) bus system in accordance with a preferred embodiment of the present invention. Computer system 300 engages in bidirectional communication with SCSI host adapter 302.

Each device 304 connected to SCSI bus 306 has its own device controller, with the host adapter designated as the first. One part of host adapter 302 is a controller 3001, device 2 contains controller 3002, device 3 contains controller 3003, and so on. The controllers 3001–3016 operate on a peer-relationship basis with each other, negotiating for bus time according to SCSI standards. SCSI bus 306 contains a number of signal lines, both for transmitting data and for controlling the flow of that data among the devices. The state machine to restore the nexus values will be a part of the controllers 3001–3016. Of course, if the SCSI devices are added over time or from different sources, some devices in-a system can contain the nexus restore as a state machine, while other devices use prior art methods. Mixing prior art controllers and the disclosed controllers can degrade the overall response of the bus over the response with only disclosed controllers.

Figure 4:
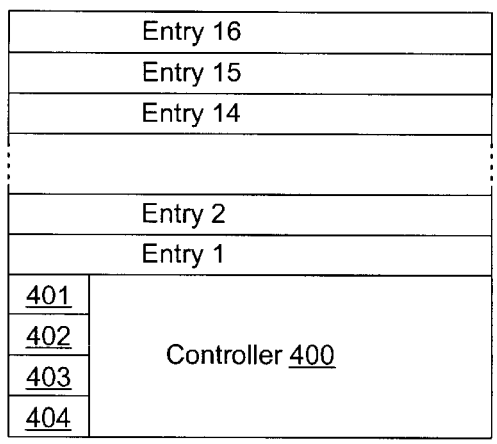
FIG. 4 is a graphical representation of a controller for a SCSI device, showing the registers and the associated memory table.

FIG. 4 is a graphical representation of a controller 400 for a SCSI device or a host adaptor, such as controller 3001 of FIG. 3. Shown are registers 401–404 and associated memory table 410. In the present embodiment, controller 400 engages in negotiations with the controllers of each of the other devices attached to the SCSI bus. This negotiation, while not limited by SCSI standards, typically takes place whenever the operating system is brought up. Each negotiation in the current embodiment produces 32 bytes of information, although the amount of information stored is expected to grow as SCSI is revised for the next generation. The negotiated information is then stored as an entry in table 410 in a low-latency storage medium, such as random access memory (RAM). The device ID (1–16) of each of the other devices is used to index the values stored.

Figure 5:
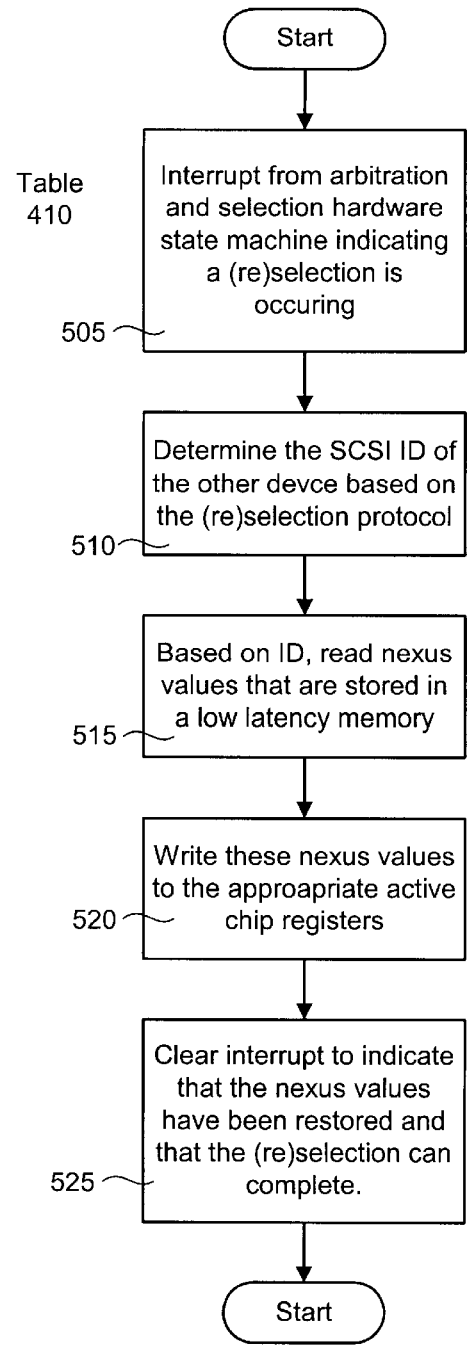
FIG. 5 is a flowchart describing the operation of the nexus restore in accordance with a preferred embodiment of the present invention.

FIG. 5 shows a flowchart of the operation of the nexus restore. The circuit for the nexus restore is part of the overall circuitry for the controller, and when triggered, performs the necessary steps without resorting to programming. An interrupt is received from an arbitration and selection hardware state machine (step 405) indicating that its corresponding device is being selected (or reselected). During the selection, the identification numbers of both the initiator device and the target device are asserted to a control line, so the nexus restore operation is able to determine the identity of the other device (step 510) and whether the current device is itself the target or initiator of the action. Using the ID of the other device, determined in step 510, the nexus restore hardware state machine obtains (step 515), the relevant information from memory. The values retrieved from memory are written (step 520) to the appropriate active registers, where they will be used. Then, the state machine interrupt is cleared (step 525) to indicate that the nexus values have been restored and the rest of the selection process can proceed.

The primary advantage to this implementation is that it takes very little time to restore values using dedicated hardware, which results in very predictable response times. Other solutions can have variable response times if the processor is handling other processes of the chip.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. An electronic device for attachment to a Small Computer System Interface (SCSI bus, said electronic device comprising:
   a first controller that is configured
      to communicate with a plurality of controllers connected to said SCSI bus,
      to negotiate parameters for data interchange with each of said plurality of controllers, and
      to store said parameters in a table,
   wherein when said first controller and a second controller from said plurality of controllers are selected for communications on said bus, ones of said parameters associated with said second controller are accessed from said table and stored in active registers by a hardware state machine.

2. The electronic device of claim 1, wherein said electronic device is a host adapter.

3. The electronic device of claim 1, wherein said electronic device is a hard disk drive.

4. The electronic device of claim 1, wherein said electronic device is a floppy disk drive.

5. The electronic device of claim 1, wherein said electronic device is a tape drive.

6. The electronic device of claim 1, wherein said second controller is a host adapter.

7. The electronic device of claim 1, wherein said second controller is a disk drive.

8. The electronic device of claim 1, wherein said table is indexed by a device number of said plurality of other controllers.

9. The electronic device of claim 1, wherein said parameters include transfer speed, transfer bus width, and synchronous offset.

10. The electronic device of claim 1, wherein said hardware state machine is a part of said controller.

11. A computer system comprising
   a processor connected to a bus through a host adaptor; and
   a plurality of storage devices connected to said bus through a plurality of respective controllers;
   wherein communications parameters negotiated between ones of said host adaptor and said plurality of respective controllers are stored in storage; and
   wherein, in at least one of said host adaptor and said plurality of controllers, said communications parameters are restored from storage to appropriate registers using a respective hardware state machine.

12. The computer system of claim 11, wherein said communications parameters include transfer speed, transfer bus width, and synchronous offset.

13. The computer system of claim 11, wherein said plurality of storage devices comprises a floppy disk drive.

14. A method of operating a computer system, comprising the steps of:
   connecting a main processor and a plurality of storage devices to a bus, wherein said main processor is connected to said bus through a host adaptor and said plurality of storage devices are connected to said bus through a plurality of respective controllers; and
   causing said host adaptor and said plurality of controllers to negotiate communication parameters with each other and to store said communication parameters, wherein, in at least one unit of said host adaptor and said plurality of controllers, communication parameters necessary for communication between said one unit and other units of said main processor and said plurality of controllers are restored by a hardware state machine.

15. The method of operating a computer system of claim 14, wherein said hardware state machine is a part of said one unit.

* * * * *